March 10, 1953 R. M. GRAY 2,630,781
PALLET CLEANING AND LUBRICATING APPARATUS
Filed April 22, 1947 2 SHEETS—SHEET 1
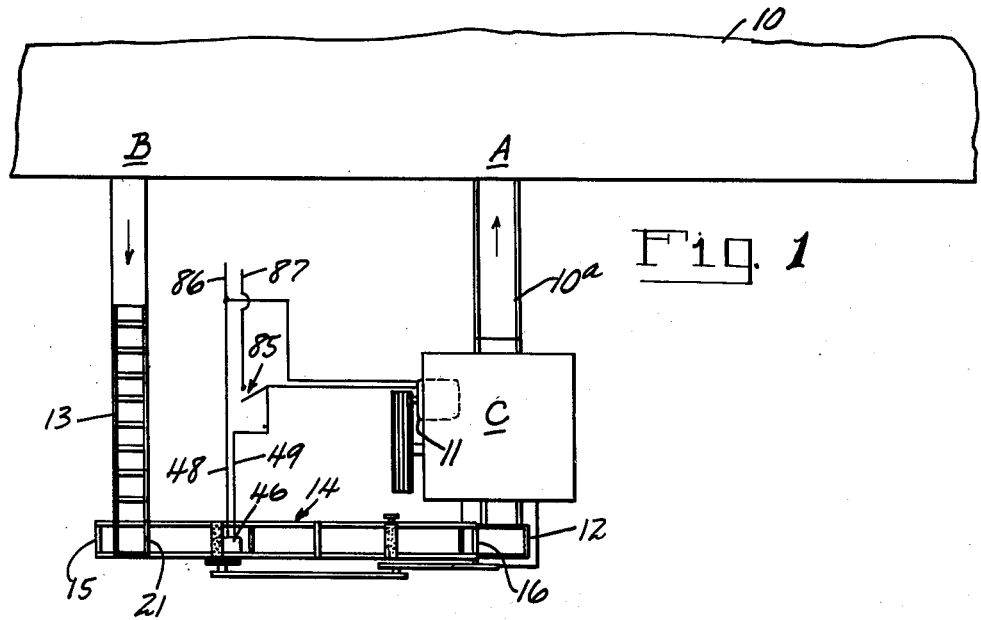
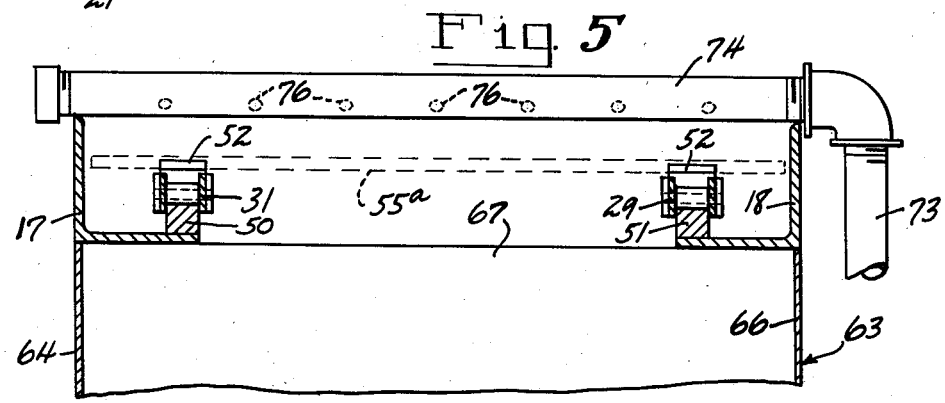
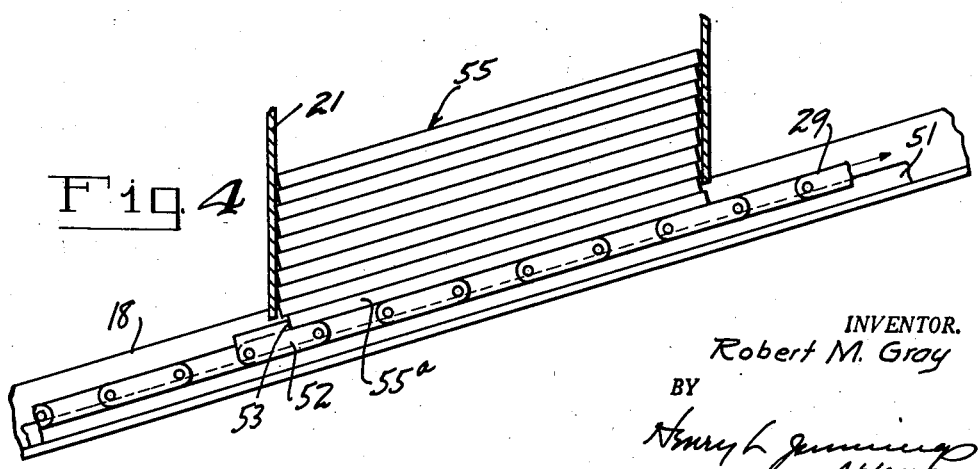
INVENTOR.
Robert M. Gray
BY
Henry L. Jennings
Attorney March 10, 1953 R. M. GRAY 2,630,781
PALLET CLEANING AND LUBRICATING APPARATUS
Filed April 22, 1947 2 SHEETS—SHEET 2
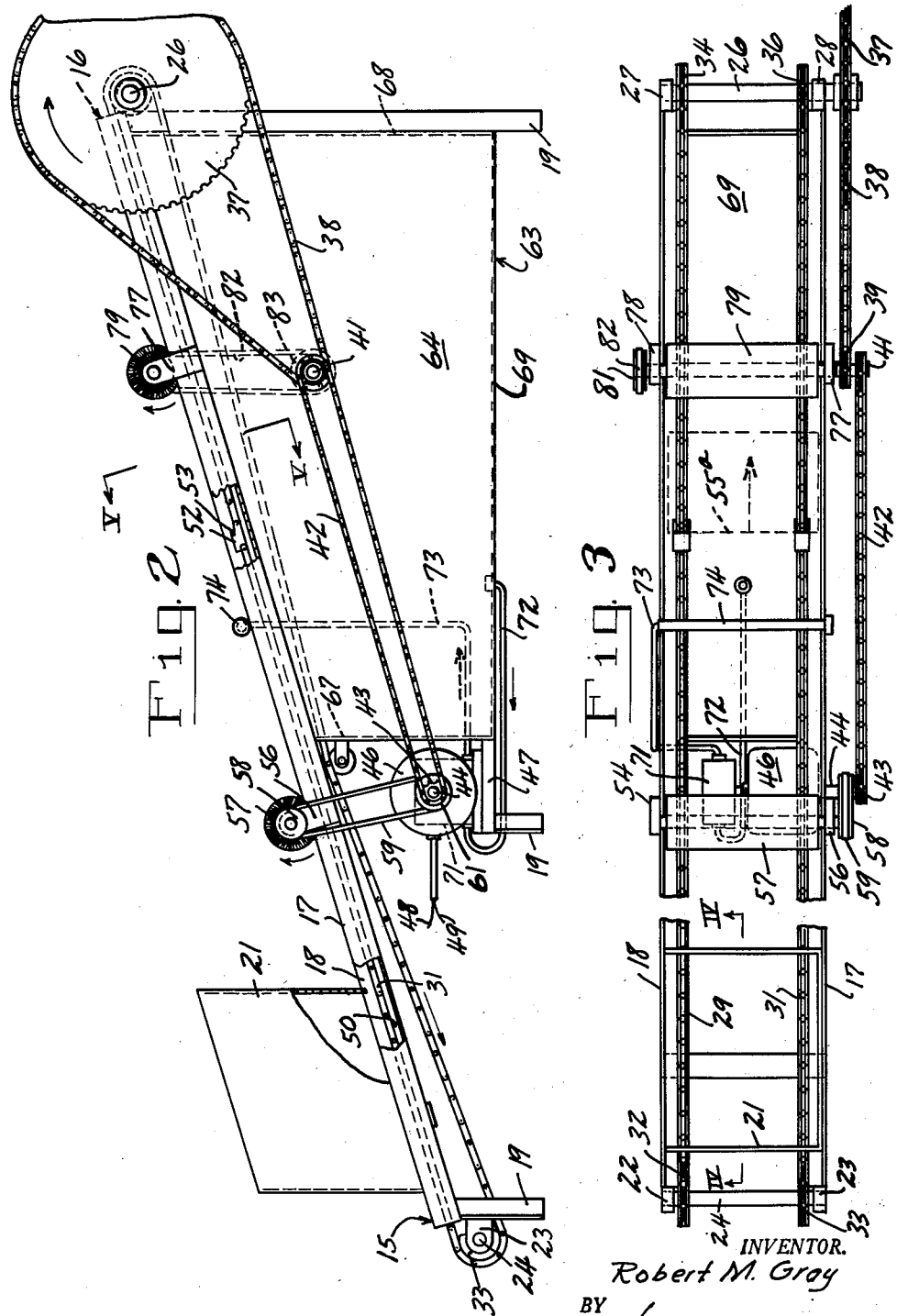
INVENTOR.
Robert M. Gray
BY
Henry L. Jennings
Attorney Patented Mar. 10, 1953

2,630,781

UNITED STATES PATENT OFFICE 2,630,781

PALLET CLEANING AND LUBRICATING APPARATUS

Robert M. Gray, Sheffield, Ala.

Application April 22, 1947, Serial No. 743,035

3 Claims. (Cl. 118—72)

My present invention relates to apparatus for handling pallets on which concrete blocks are formed in a block making machine and while not limited thereto, relates particularly to mechanism especially adapted for association with that described and claimed in my copending application, Serial No. 530,339, filed April 10, 1944, now Patent No. 2,423,557.

One object of my invention is to provide apparatus for mechanically transferring pallets from the unloading station of a curing kiln to the pallet supply hopper of the concrete block making machine, thereby to maintain an adequate supply of empty pallets in the supply hopper of the machine without the necessity of manually handling the same.

A further object is to provide mechanism of the character described which is operable in timed relation with respect to the operation of the concrete block making machine, thereby to replace an empty pallet in the supply hopper of the machine for each pallet loaded by the machine.

A further object of my invention is to provide means associated with my pallet handling or transfer mechanism to thoroughly remove all particles of concrete material clinging to the empty pallets, to lubricate the same, and to remove excess lubricant therefrom during the process of moving the same from the unloading station to the concrete block machine.

Heretofore, in the art to which my invention relates, it has been customary to return pallets manually to the block making machine after the same have emerged from the curing kiln. The pallets commonly in use are rather heavy steel plates of approximately ¼ inch thickness and the manual handling thereof is a laborious job. Further, after the blocks are deposited on the pallets by the block machine and the same have passed through the curing kiln, it is found that considerable amounts of concrete adhere to the surface of the pallets. In order to prevent roughening of the surface of the next block formed on the pallets, it is desirable to clean the block receiving surface. In order to prevent the blocks from sticking it is necessary also to lubricate the block receiving face of the pallets, and the same has heretofore been accomplished by swabbing the pallet with a brush or mop. Heretofore, the amount of lubricant deposited on the surface of the pallet has necessarily been dependent solely upon the skill of the individual operator with the result that too little or too much lubricant is applied. Accordingly, it is a prime object of my invention to overcome these difficulties of cleaning and oiling the pallets while at the same time mechanically transferring the same from the unloading station back to the pallet supply hopper or magazine of the concrete block machine.

Apparatus embodying features of my invention is illustrated in the accompanying drawings forming a part of this application in which:

Fig. 1 is a diagrammatic plan view of a portion of a circular kiln and showing the relative position of my improved pallet handling mechanism with respect to the unloading station and the block machine;

Fig. 2 is a side elevational view of my improved pallet handling mechanism partly broken away and in section;

Fig. 3 is a plan view of the same;

Fig. 4 is a detail sectional view taken generally along the line IV—IV of Fig. 3 and showing a stack of pallets in the supply hopper; and Fig. 5 is a detail sectional view taken along line V—V of Fig. 2.

Referring now more particularly to Fig. 1 of the drawing, I show a portion of a kiln 10 which may be of the circular type shown in my beforementioned application. The kiln is provided with a loading station A into which are placed pallets loaded with blocks for making the curing circuit through the kiln. After curing, the blocks emerge at the unloading station B.

At C is shown diagrammatically a plan view of a concrete block forming machine which forms the blocks, deposits them on the pallets, and delivers the loaded pallets by means of a conveyor 10ª into the kiln 10 at the loading station A. The concrete block machine is driven by a motor 11 and is provided at its rear with a pallet supply hopper 12 from which empty pallets are withdrawn during operation of the machine by the usual means forming a part of the block machine itself and not specifically shown in the drawings.

The loaded pallets come out of the kiln at the unloading station B onto a conveyor 13 where the blocks are removed from the pallets either by hand or by the use of certain lifting mechanisms, not shown. My improved pallet handling device, indicated generally at 14, is positioned with its feed end 15 in pallet receiving position with respect to the outer end of the conveyor 13, and with its discharge end 16 in pallet delivery position with respect to the pallet supply hopper 12 of the concrete block machine.

Referring now more particularly to Figs. 2, 3, and 5, my improved pallet handling device comprises a pair of spaced frame members 17 and 18 which preferably are angles with one leg disposed horizontally and the other leg disposed vertically. The side members 17 and 18 are supported in an inclined position from the feed end 15 to the delivery end 16 of my apparatus by means of vertical legs 19. Suitably secured to the side members 17 and 18 at the feed end of the machine is a hopper 21 for receiving pallets as they come off the end of the conveyor 13. The hopper 21 is open on the side adjacent the conveyor 13 and the pallets are deposited therein from that side.

Mounted in suitable bearings 22 and 23 at the feed end 15 of my improved machine is a shaft 24. A similar shaft 26 is mounted in suitable bearings 27 and 28 at the delivery end 16, and a pair of conveyor chains 29 and 31 pass over sprockets 32 and 33 on the shaft 24, and sprockets 34 and 36 on the shaft 26. Mounted on one end of the shaft 26 is a large sprocket 37 driven by a chain 38 from a sprocket 39 mounted on a countershaft 41.

The shaft 41 extends across the machine and is driven by a chain 42 from a sprocket 43 carried on the shaft 44 of an electric motor 46. The motor 46 is suitably mounted on a support 47 and is energized through leads 48 and 49, in a manner later to be described.

Referring more particularly to Fig. 5 of the drawing, it will be seen that the chains 29 and 31 are supported on runners 50 and 51 secured to the horizontally disposed legs of the angles 17 and 18. Each of the chains 29 and 31 is provided with a dog 52 having a portion 53 thereof adapted to engage the rear edge of the lowermost pallet 55a of a stack of pallets 55 in the hopper 21 and withdraw the same.

Mounted in suitable bearings 54 and 56 above the members 17 and 18 is a rotary brush 57 driven by a pulley 58, belt 59, and pulley 61 on the motor shaft 44. The brush 57 is located in close proximity to the chains 29 and 31 and is disposed to engage and remove from the upper surfaces of the pallets any concrete material adhering thereto as the pallets move up the machine.

Extending from the discharge end 16 of the machine is a tank 63 containing a supply of lubricant and having side walls 64 and 66, end walls 67 and 68 and a bottom 69. Mounted on the motor support 47 and driven by the motor is a pump 71. Leading from the bottom of the tank 63 to the intake side of the pump is a conduit 72 and leading from the outlet side of the pump is a conduit 73. Spanning the top of the tank and suitably secured to the members 17 and 18 is a pipe 74 to which is connected the conduit 73 from the pump. The pipe 74 is provided along its length with a plurality of small openings 76 through which lubricant under pressure from the conduit 73 is sprayed downwardly on the upper surfaces of the pallets as they pass therebeneath.

Mounted in suitable bearings 77 and 78 is a second brush 79 similar to the brush 57, driven through a pulley 81, belt 82 and pulley 83 on the opposite end of the countershaft 41. As the pallets move upwardly on the chains 29 and 31, they are subjected first to a cleaning action by brush 57 to remove concrete particles, secondly, to a spray of lubricant from the pipe 74, and thence to the action of the brush 79 which removes excess lubricant therefrom, the excess falling back into tank 63. Since the tank does not extend beneath roller 57, abrasive material removed from the pallets by this brush is not deposited in the tank, but falls downwardly between the frame members 17 and 18 when the brush rotates in the direction indicated in Fig. 2.

Referring now more particularly to Fig. 1 it will be seen that the motors 11 and 46 are controlled by a common switch 85, controlling a source of E. M. F. from lines 86 and 87. Therefore, when the block machine motor 11 is energized, the motor 46 driving my improved mechanism also is energized.

From the foregoing, the operation of my improved pallet handling mechanism will be readily understood. The concrete block machine C forms the blocks, deposits them on the pallets. The loaded pallets enter the kiln 10 at A, make the curing cycle, and thence emerge from the kiln at the unloading station B. The loaded pallets come out onto the conveyor 13 where the blocks are removed from the pallets. The pallets now roll by gravity down the conveyor 13 into the hopper 21 of my improved pallet handling mechanism. The speed of the conveyor chains 29 and 31 is so regulated with respect to the speed at which the machine C is loading pallets that a pallet is deposited in the hopper 12 for each pallet withdrawn therefrom. As the chains 29 and 31 move, the dogs 52 engage the rear edge of the lowermost pallet 55a as best seen in Fig. 4 and withdraw it from the bottom of the stack 55 in hopper 21. As the pallet progresses upwardly, the brush 57 contacts the upper surface of the same and removes any concrete material adhering thereto. The pallet next passes beneath the spray pipe 74 where it receives a bath of lubricant pumped thereto by the pump 71, some of the excess oil running off the pallet and dropping back into the tank 63. As the cleaned and lubricated pallet progresses farther up the machine, it is engaged by brush 79 which removes the remaining excess lubricant therefrom. The pallet then passes off the end of the conveyor chains 29 and 31 into the pallet supply hopper 12 of the concrete block machine C.

From the foregoing, it will be apparent that I have devised an improved pallet handling mechanism which is operable to clean the pallet, oil the same, and remove the excess oil therefrom while simultaneously transporting the same from the point of unloading of the blocks back to the supply hopper of the concrete block machine. It will be further apparent that my machine is simple of construction and operation and in practice I have found that the same is efficient both as a labor saving device and as a cleaning and lubricating device for the pallets. It also will be apparent that my improved pallet handling mechanism automatically deposits a cleaned and lubricated pallet in the supply hopper 12 of the block machine for each pallet loaded.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In pallet handling apparatus, a hopper open on one side for holding a stack of pallets, a conveyor feeding pallets to the hopper through the open side, a pair of chains movable beneath the hopper, dogs on said chains disposed to engage the lowermost pallet of the stack and withdraw the same, a rotary cleaning brush positioned above said pair of chains to engage the upper surface of each pallet while it is on the chains, a tank for a supply of lubricant open at its top and positioned beneath the chains rearwardly of the brush, a lubricant spray pipe over the chains and said tank, means to supply lubricant to the pipe from the tank, and a second rotary brush positioned over the chains and said tank and disposed to remove excess lubricant from the pallet while it is on the chains.

2. In pallet handling apparatus, an inclined frame, a pallet hopper at the lower end of the frame for receiving a stack of pallets, a conveyor movable beneath the hopper and comprising a pair of chains driven from a common shaft, dogs on the chains disposed to engage the lowermost pallet and withdraw the same from the stack, a rotary brush positioned above said chains for cleaning the upper surface of the pallet as it passes therebeneath, an open tank containing a supply of lubricant positioned rearwardly of the brush, a spray pipe over the chains and tank to lubricate the cleaned surface of the pallet as it passes therebeneath, means to circulate lubricant from the tank to the spray pipe, and a second rotary brush behind the spray pipe and above said chains and tank disposed to brush excess lubricant from the pallet and deposit it back in said tank.

3. In pallet handling apparatus, a conveyor bed inclined from the pallet receiving end to the discharge end and embodying a pair of angles having their flanges inturned, a supply hopper for holding a stack of pallets and positioned at the low end of the bed, a pair of chains with the upper flights thereof slidable on the inturned flanges of the angles and passing beneath the hopper, dogs on each chain to engage the lowermost pallet of the stack and withdraw the same, a rotary cleaning brush mounted above the bed and disposed to engage the upper surface of a pallet as it passes therebeneath, a lubricant supply tank substantially the width of the bed and extending in length from immediately rearwardly of the brush to the higher end of the bed, a spray pipe above the bed and tank and disposed to lubricate a pallet as it passes therebeneath, a pump to supply lubricant from the tank to the spray pipe, a second rotary brush mounted above the bed and tank and disposed to brush excess oil off the pallet back into the tank, and a motor for driving the chains, brushes, and pump.

ROBERT M. GRAY.

REFERENCES CITED

The following references are of record in the file of this patent:

UNITED STATES PATENTS

| Number | Name | Date |
|---|---|---|
| 965,003 | Pauly | July 19, 1910 |
| 1,440,715 | Bliss | Jan. 2, 1923 |
| 1,540,110 | Dittmar | June 2, 1925 |
| 1,643,392 | Mullaney | Sept. 27, 1927 |
| 1,652,697 | Boettger | Dec. 13, 1927 |
| 1,695,327 | Goldston | Dec. 18, 1928 |
| 1,708,106 | Pinsuti | Apr. 9, 1929 |
| 1,716,349 | Wallace | June 4, 1929 |
| 1,900,625 | Walker | Mar. 7, 1933 |
| 2,066,846 | McNeil | Jan. 5, 1937 |
| 2,160,484 | Miller | May 30, 1939 |
| 2,360,918 | Wade | Oct. 24, 1944 |
| 2,467,203 | Gelbman | Apr. 12, 1949 |